United States Patent [19]

Harwood, Jr.

[11] Patent Number: 4,801,082
[45] Date of Patent: Jan. 31, 1989

[54] SECURITY ACTIVATED LOAD CONTROL

[75] Inventor: Charles Harwood, Jr., Richmond, Va.

[73] Assignee: Harwood-Moody, Ent., Inc., Richmond, Va.

[21] Appl. No.: 178,365

[22] Filed: Apr. 6, 1988

[51] Int. Cl.$^4$ .............................................. G08B 13/00
[52] U.S. Cl. .................................. 236/46 R; 165/11.1; 340/541
[58] Field of Search ..................... 236/47, 94, 46 R; 165/11.1; 340/541, 545

[56] References Cited

U.S. PATENT DOCUMENTS

| 4,060,123 | 11/1977 | Hoffman | 236/47 X |
| 4,232,819 | 11/1980 | Bost | 236/47 |
| 4,315,596 | 2/1982 | Johnson, Jr. et al. | 236/94 |
| 4,318,508 | 3/1982 | Glasgow et al. | 236/47 |
| 4,319,712 | 3/1983 | Bar | 236/47 |
| 4,323,762 | 4/1982 | Ervin | 219/482 |
| 4,391,406 | 7/1983 | Fried | 236/47 |
| 4,433,809 | 2/1984 | Schulz | 236/47 |
| 4,505,426 | 3/1985 | Rossi et al. | 236/47 |
| 4,632,177 | 12/1986 | Beckey . | |

FOREIGN PATENT DOCUMENTS 2181285 4/1987 United Kingdom ................ 340/541

OTHER PUBLICATIONS

WO 85/05753 12/1985 International Application Bird.
WO 82/02608 8/1982 International Application Miles.
Econ'Home Systems: The Circuit Cut Off Card.
Security Control Moose Products Inc. 1984.

Primary Examiner—William E. Wayner
Attorney, Agent, or Firm—Dowell & Dowell

[57] ABSTRACT

A power saving system for a hotel guest room has a keyboard operated control circuit that controls operation of an electrical load, such as a room air conditioner, and arms a door-window security circuit. When the guest enters the room, he disables the load control and security alarm system by actuation of a suitable contact on the keyboard. Prior to leaving the room, in order to secure it, he enables the security alarm system, and also the electrical load control, by making a suitable entry on the keyboard.

3 Claims, 1 Drawing Sheet

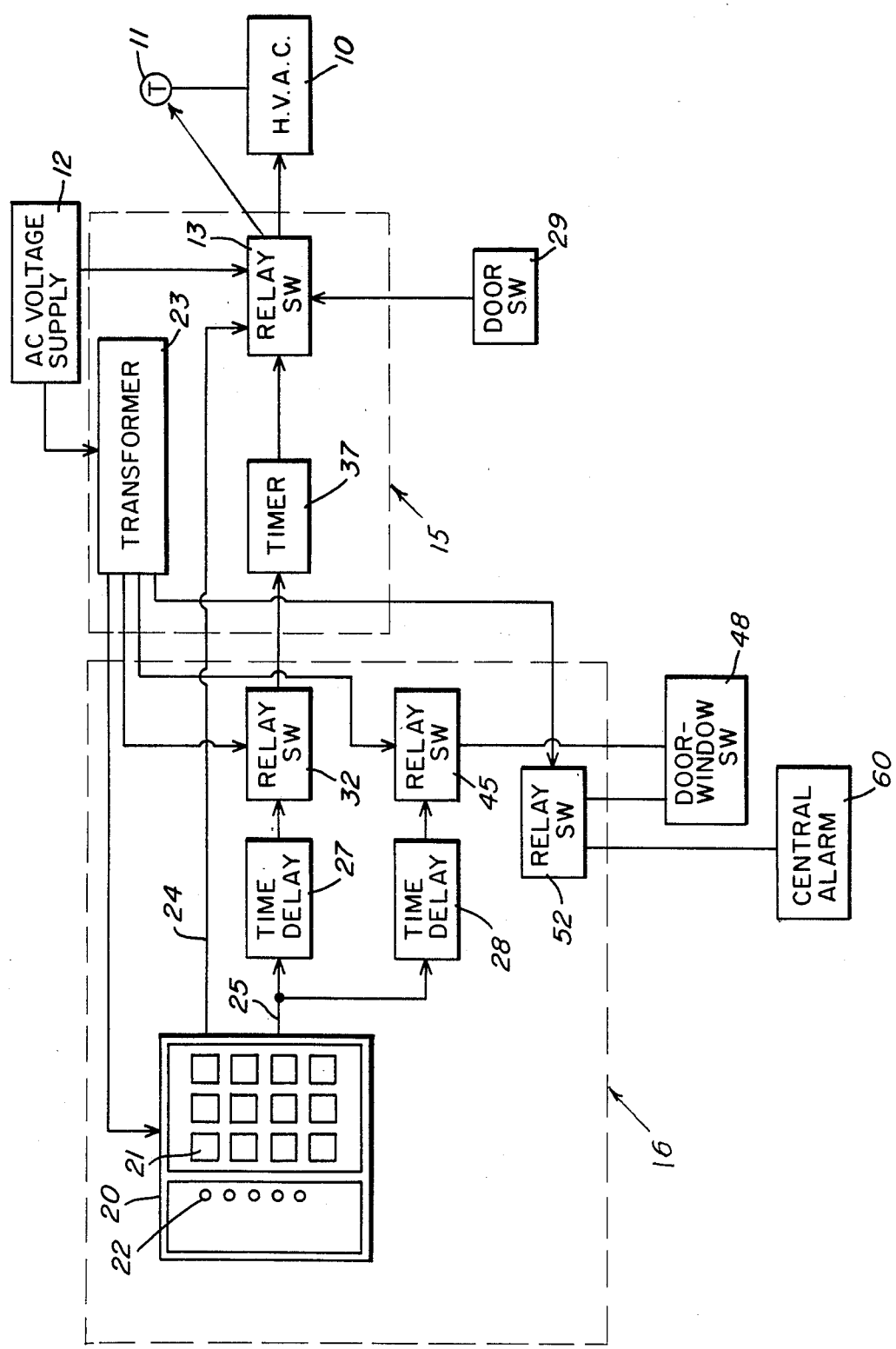

SECURITY ACTIVATED LOAD CONTROL

BACKGROUND OF THE INVENTION

Field of the Invention

This invention relates to the conservation of energy by encouraging the use of energy control means during absences from the space in which the energy is consumed.

Description of the Prior Art

The use of guest rooms in hotels and motels involves a considerable amount of electrical energy, especially for heating, ventilating and air conditioning (HVAC). If the energy consumer equipment is left running constantly or under the control of a device such as a thermostat, a vast amount of unnecessary energy ordinarily is used. Since the spaces involved are relatively small with reference to the capacity of the energy consumer, the space may generally be brought to a comfort level within a brief time after startup of the equipment. Furthermore, by running the equipment for a short period of time intermittently, the space may be maintained at or close to a comfort level that is satisfactory.

Previous attempts to encourage a guest to turn off power consuming equipment have been attempted but these have generally required the guest to use a key or a magnetic card in order to actuate or operate a circuit and in many instances, the guests have simply balked at undertaking such extra effort on behalf of the hotel in which they are a guest.

The U.S. Pat. No. 4,319,712, to Bar, discloses a magnetic card-operated control means for various power outlets in a guest room. The guest is required to insert the card into the control means in order to have permissive use of the various power outlets. Upon his removal of the card in order to have his key available, the control means is actuated.

The brochure of Eco N'home Systems (1982) discloses a similar arrangement to that in the Bar patent.

The U.S. Pat. No. 4,232,819, to Bost, and U.S. Pat. No. 4,060,123, Hoffman et al., disclose card or key operated devices for controlling power to various systems in a room.

The U.S. Pat. No. 4,391,406, to Fried, discloses a control system which is in circuit with a door lock switch so that when the door is closed, the various loads may be used but when the door is open, the control means is actuated.

The U.S. Pat. No. 4,323,762, to Ervin, discloses a key operated device for controlling the power to an electrical load, the key being connected to a room key so that when the user removes the key to leave the room, the load elements are deenergized.

The U.S. Pat. Nos. 4,315,596, to Johnson et al., Schulz 4,433,809, Glasgow et al. 4,318,508 and Rossi et al. 4,505,426 disclose systems for detecting the presence of persons in an occupied space in order that controls for reduction of energy use may be enabled when the space is unoccupied.

The United States Patent to Beckey discloses a keyboard operated clock thermostat for programming operation of a thermostat.

The brochure (1984) of Moose Products Inc. of Hickory, N.C. for a system identified as MPI-775 discloses keyboard operated system for controlling operation of a burglar alarm and a lamp.

SUMMARY OF THE INVENTION

It is an object of the present invention to encourage a guest in a hotel room to condition apparatus for conserving energy use in the room during his absence by inducing him to arm a security system for the room in a simple manner and without requiring the use of a key or a magnetic card.

A further object of the invention is the provision of a security system which may be armed by a guest prior to leaving a room and which may be disarmed by hotel employees upon entering the room as for maintenance and the like and without requiring the use of any key or magnetic device.

A still further object is to provide for energy conservation by shutting off an energy user such as an air conditioner when an outside door or the like is opened.

These and other objects of the invention will become apparent from the following description in conjunction with the accompanying drawing.

BRIEF DESCRIPTION OF THE DRAWING

The drawing is a block diagram of an embodiment of the present invention.

DESCRIPTION OF THE PREFERRED EMBODIMENT

With further reference to the drawing, a hotel space is provided with a heating, ventilating, air conditioning unit (HVAC) 10 having a conventional thermostatic control 11 and which is powered from an AC power supply 12 controlled by a relay switch 13. Other loads may be used in the room and controlled by the same means, the HVAC unit merely being illustrative.

The relay switch 13 is part of a load controller 15 which is connected to a control panel 16.

Both the load controller and control panel may be purchased items or substantially similar thereto, the load controller being similar to the Eco N'home System which is likewise similar to the disclosure in the Bar U.S. Pat. No. 4,319,712.

The control panel itself is similar to the Moose MPI-775 control panel which is referred to above.

The control panel has a keyboard 20 with keys 21 and indicator lights 22. The keyboard receives a low voltage power supply from transformer 23 and is for the purpose of actuating a control circuit. The keyboard is of the conventional type which produces different output signals depending on the code which is keyed in.

Operation of one or more of the keys 21 or an adjunct key places the control circuit in such condition that its output activates the relay switch 13 through line 24. Operation of a predetermined combination of other keys 21 disconnects the control circuit from the relay switch 13 and connects it to line 25 to the time delay circuits 27 and 28.

Thus, if a guest is present in the room or if the room has not been let to a guest and the hotel wishes to deenergize the control means and the security means, then the key is pressed for conditioning the control circuit to line 24 to energize the relay 13. When the relay 13 is energized, the power supply or thermostat provides full operation, subject to the thermostat 11 and a door switch 29.

When the guest is ready to leave the room and operates the preset combination of buttons 21, then the control circuit is conditioned to provide energization to the time delay 27 and time delay 28 instead of through the line 24.

The time delay 27, after a suitable period of time, for example, two to three minutes, permits the relay switch 32 to be energized to feed the output from the transformer 23 to a timer 37, of electronic or electromechanical construction. The timer is operative to turn the relay switch 13 on and off to energize and deenergize either the H.V.A.C. or the thermostat 11, depending on the hookup.

The timer 37 is preset, it having been found that operation "on" for approximately seven minutes of every half hour provides efficient economical use of the system in a given locality.

When the time delay 28 is energized, it feeds to a relay switch 45, fed from transformer 23, and connected to a door-window switch 48 which is connected to relay switch 52, also fed from transformer 23. Relay 52 is connected to send a signal to a central alarm system 60 in the event that a protected door or window is opened while the relay switch 52 is armed.

The time delay 28 may be for a suitable interval such as 30 seconds to give the guest ample time in which to leave the room after he actuates the key pad 20. Since it is in the guest's interest to set the security system in armed position prior to leaving the room, it is likely that most guests will undertake to do this and will at the same time place the control for the energy load in operation.

Upon check-in at the hotel, the guest is informed that the hotel has a security system that is designed to protect the room while the guest is out but that it is not to be used while the guest is in the room. When the guest is taken to the room, he is shown the keypad near the door and instructed on how to use the security system. Using a personal code number, the guest activates the security system upon leaving the room. After a predetermined delay, e.g. 30 seconds, the security system is armed through time delay 28, relays 45 and 52, and switch 48. After a delay of approximately two minutes, the load controller 15 is activated so that the HVAC is operated only approximately seven minutes of each half hour.

When the guest returns and deactivates the security system, the HVAC will immediately turn on if the thermostat calls for it. Should a guest open a patio or balcony door, the switch 29 will cause the relay 13 to shut off the HVAC as long as the door is open.

I claim:

1. A power saving system for conserving energy consumption by a primary electric load and which is responsive to room security activation, comprising: a key pad operated control circuit,
    first means connecting said control circuit to supply means tor said load when said control circuit is in a first condition,
    second means connecting said control circuit through a control means to said supply means for said load when said control circuit is in a second condition,
    said control means having timing means operative repetitively to connect said control circuit to said load for a predetermined time interval,
    and third means connecting said control circuit to room security switch means when said control circuit is in said second condition.

2. The invention of claim 1, in which said second and third means have time delay means.

3. The invention of claim 1, and means operative to shut down operation of said electric load independently of said first and second means.

* * * * *